United States Patent [19]

Chevrier et al.

[11] Patent Number: 5,363,531
[45] Date of Patent: Nov. 15, 1994

[54] WINDSCREEN WIPER ARM, PARTICULARLY FOR A HIGH-SPEED VEHICLE

[75] Inventors: Pascal Chevrier, Ozoir la Ferriere; Edmond Faubeau, Andilly, both of France

[73] Assignee: Forges de Belles Ondes, Paris, France

[21] Appl. No.: 100,419

[22] Filed: Aug. 2, 1993

[51] Int. Cl.$^5$ .............................. B60S 1/20; B60S 1/37; B60S 1/116
[52] U.S. Cl. .............................. 15/250.04; 15/250.23; 15/250.32; 15/250.35; 15/250.34
[58] Field of Search ............ 15/250.23, 250.21, 250.22, 15/250.35, 250.01–250.04, 250.16, 250.34, 250.32, 250.31

[56] References Cited

U.S. PATENT DOCUMENTS

| | | | |
|---|---|---|---|
| 2,279,983 | 4/1942 | Goode et al. | 15/250.23 |
| 2,326,231 | 8/1943 | Kraemer | 15/250.23 |
| 2,738,536 | 3/1956 | Spencer, Jr. | 15/250.23 |
| 3,126,569 | 3/1964 | Scott et al. | 15/250.23 |
| 3,427,675 | 2/1969 | Tibbet | 15/250.35 |
| 3,440,679 | 4/1969 | Druseikis | 15/250.04 |
| 3,758,911 | 9/1973 | de Lavenne et al. | 15/250.23 |
| 4,546,518 | 10/1985 | Harbison et al. | 15/250.23 |
| 5,090,082 | 2/1992 | Alber et al. | 15/250.001 |

FOREIGN PATENT DOCUMENTS

| | | | |
|---|---|---|---|
| 147782 | 7/1985 | European Pat. Off. | |
| 1530629 | 10/1969 | Germany | |
| 3504549 | 8/1986 | Germany | |
| 3907980 | 9/1990 | Germany | 15/250.04 |
| 790775 | 2/1958 | United Kingdom | 15/250.23 |
| 2082051 | 3/1982 | United Kingdom | |
| 2108828 | 5/1983 | United Kingdom | 15/250.23 |

OTHER PUBLICATIONS

Search Report FR 91 04428.
Abstracts P 15 30 629.3.
Abstracts EPO 84115789.4.
Abstracts P 35 04 549.3.

*Primary Examiner*—David A. Scherbel
*Assistant Examiner*—Gary K. Graham
*Attorney, Agent, or Firm*—Pollock, Vande Sande & Priddy

[57] ABSTRACT

The arm (1) is intended to be mounted, at one end, on a drive shaft (6a) capable of imparting to it an alternating rotational movement, the said arm being equipped, at its end (16) remote from the drive shaft, with a windscreen wiper blade (21) and being articulated, in the vicinity of the drive shaft, on an axis (C—C) which is substantially parallel to the surface of the windscreen to be wiped in order to allow the arm to be lifted, which arm is returned by elastic means. The arm (1) is formed of a tubular element (2); an orientation member (12) which is fixed with respect to the supporting structure of the windscreen is provided in the vicinity of the shaft (6a), and includes a fixed support point (P); the end (16) of the arm carries a lever (17) mounted so that it can rotate about an axis (18) which is substantially parallel to the shaft (6a), the windscreen wiper blade (21) being carried by this lever (17); linkage means (L) are provided inside the tubular element (2) between the abovementioned fixed support point (P) and a point (20) on the lever (17) in order to keep this lever (17) parallel to a fixed direction (D) when the arm (1) rotates, the windscreen wiper blade (21) connected to the lever (17) thus moving parallel to itself.

7 Claims, 4 Drawing Sheets

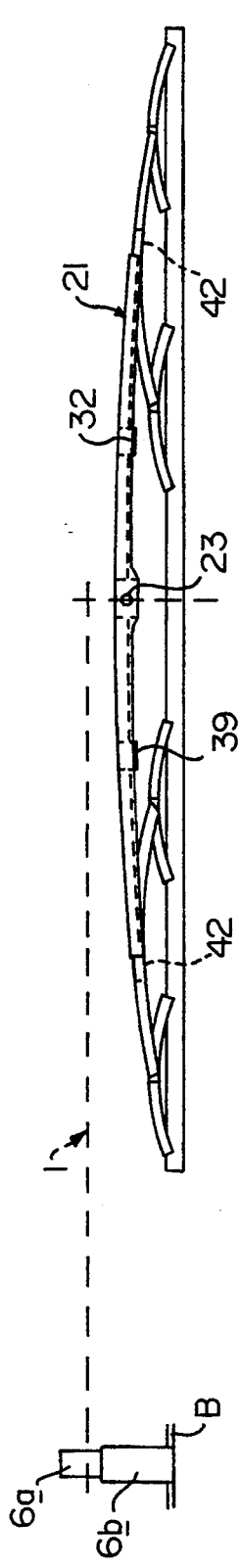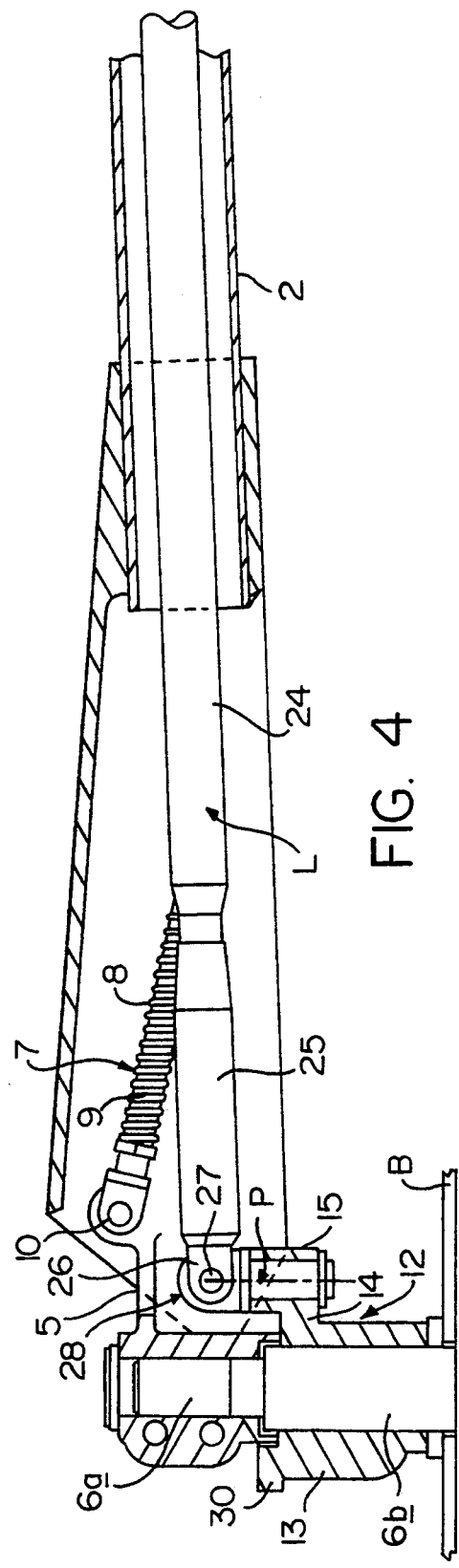

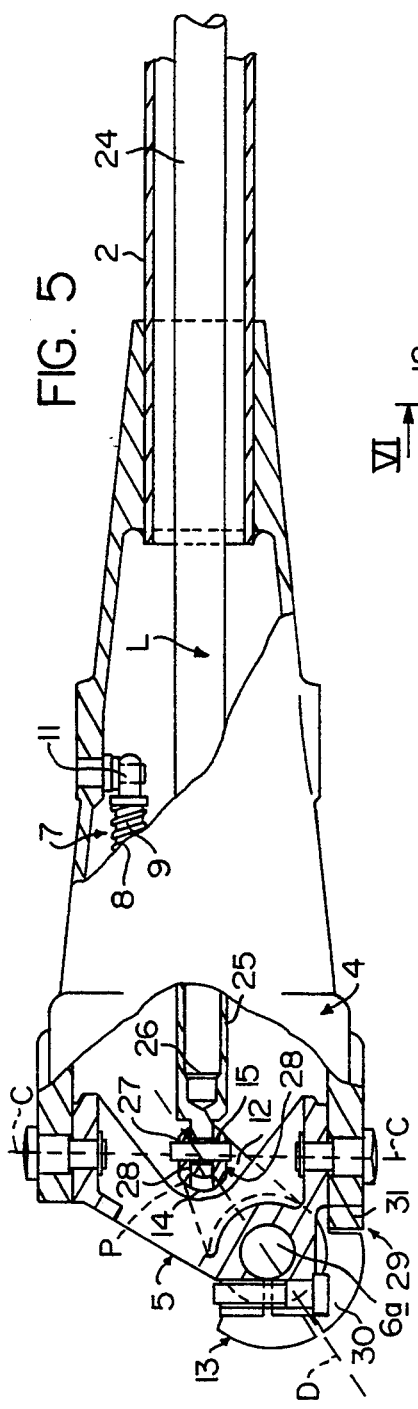
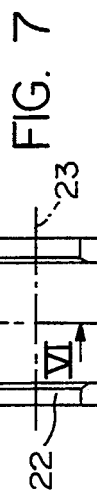
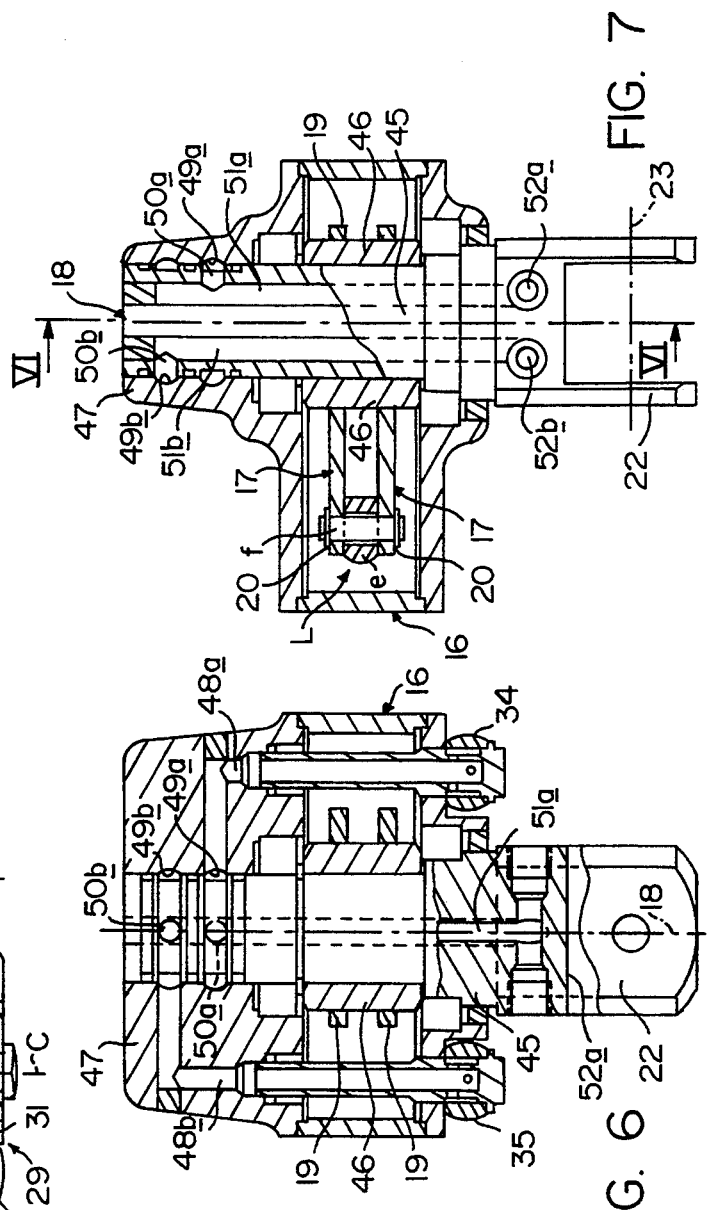

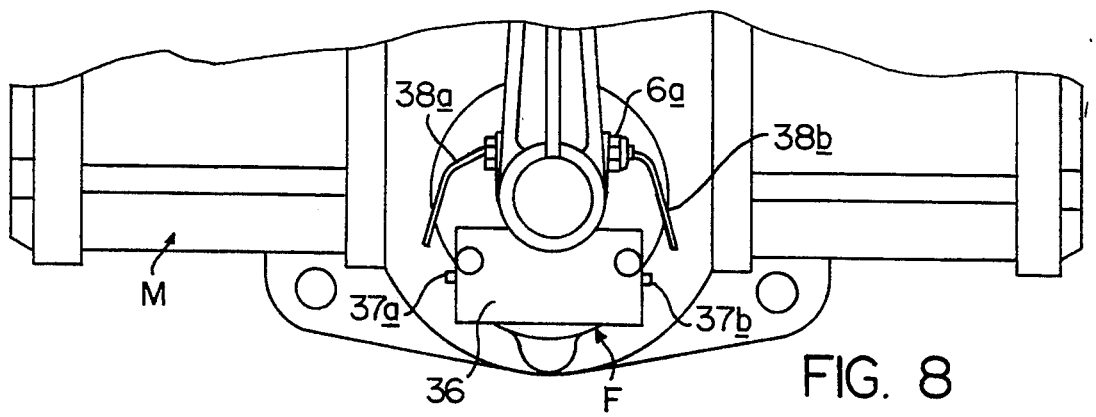
FIG. 8
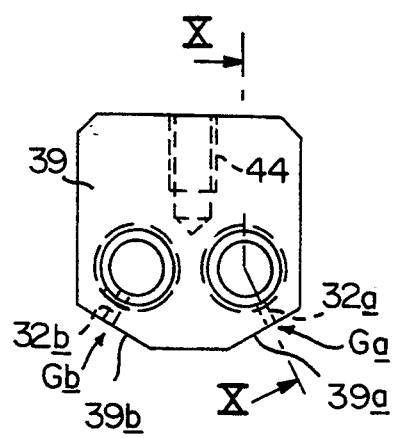
FIG. 9
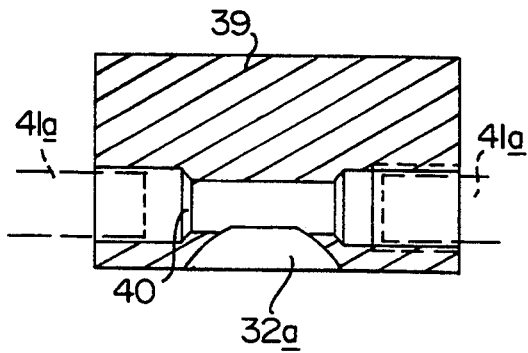
FIG. 10
FIG. 11
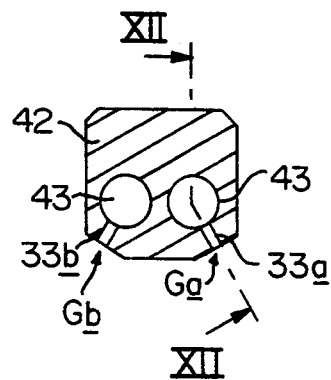
FIG. 12
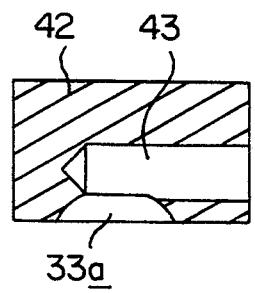

WINDSCREEN WIPER ARM, PARTICULARLY FOR A HIGH-SPEED VEHICLE

The invention relates to a windscreen wiper arm, particularly for a high-speed vehicle. The arm is intended to be mounted, at one end, on a drive shaft capable of imparting to it an alternating rotational movement. The arm is equipped, at its end remote from the drive shaft, with a windscreen wiper blade and is articulated, in the vicinity of the drive shaft, on an axis which is substantially parallel to the surface of the windscreen to be wiped in order to allow the arm to be lifted. The arm is returned by elastic means against the windscreen.

The invention relates more particularly, because it is in this case that its application seems to present the greatest interest, but not exclusively, to a windscreen wiper arm for a very high-speed train.

Windscreen wiper arms are known which are formed by a deformable parallelogram capable of moving the windscreen wiper blade parallel to itself.

Such windscreen wiper arms make it possible to obtain a sizeable wiped surface, with parallel edges. However, they are relatively bulky due to the presence of a deformable parallelogram and offer a sizeable wind-catching surface. This is troublesome, in particular for very high-speed vehicles, because the arm tends to move away from the windscreen under the effect of the relative wind, so that wiping is no longer provided satisfactorily at high speeds.

Futhermore, the articulations between the various parts of the deformable parallelogram are sources of play which tend to increase with wear and make the operation of the arm less satisfactory. Such a parallelogram is furthermore relatively fragile.

The object of the invention, above all, is to provide a windscreen wiper arm of the previously defined type, which exhibits to a lesser extent, the drawbacks recalled hereinabove and which, in particular, offers a reduced wind-catching surface whilst being robust and whilst providing a movement of the windscreen wiper blade parallel to a fixed direction.

SUMMARY OF THE INVENTION

According to the invention, a windscreen wiper arm of the previously-defined type is characterized in that it is formed of a tubular element, in that an orientation member which is fixed with respect to the supporting structure of the windscreen is provided in the vicinity of the drive shaft, this orientation member including a fixed support point, in that the end of the arm remote from the drive shaft carries a lever mounted so that it can rotate, in relation to the arm, about an axis which is substantially parallel to the drive shaft, the windscreen wiper blade being carried by this lever, and in that linkage means are provided inside the tubular element constituting the arm between the abovementioned fixed support point and a point on the lever in order to keep this lever parallel to a fixed direction when the arm rotates, the windscreen wiper blade connected to the lever thus moving parallel to itself.

Preferably, the tubular element constituting the arm is bent.

The linkage means between the fixed support point and the point on the lever are advantageously set out so as to keep a constant length between these two points when the arm rotates. These linkage means preferably comprise a flexible rod, particularly made from plastic, arranged inside the tubular element.

The flexible rod may extend from the fixed support member as far as the point on the lever, passing through the bend of the tubular element, this flexible rod being sufficiently strong so as not to flatten and to retain a constant length as it bends.

As a variant, the flexible rod is provided over only a fraction of the length of the tubular element incorporating the bend, this flexible rod being extended at each of its ends by straight rigid rods.

The windscreen wiper arm includes a base which is articulated onto a clevis and mounted on the drive shaft so as to allow the arm to be lifted, the linkage means provided inside the arm for establishing a constant length between the fixed support point and the lever themselves being articulated to the fixed support point, the articulations or the arm and of the abovementioned linkage means being arranged so as to have their axes aligned for a given angular position of the arm relative to the supporting structure, stop means being provided between the base of the arm and the clevis in order to oppose the lifting of the arm when the angular position of the arm relative to the supporting structure is different from the one providing the alignment of the abovementioned axes.

Advantageously, the arm, particularly at the level of the blade, is equipped with two series of nozzles for the purpose of cleaning the windscreen, each series being supplied with liquid by an independent pipe carried by the arm, under its lower part.

Supply means are provided in order to supply each series of nozzles in succession during the to-and-fro movements of the arm; this makes it possible to save liquid.

Advantageously, the nozzles of one series have their axes inclined in one direction, while the nozzles of the other series have their axes inclined in another direction, the supply to the nozzles being designed so that the windscreen is always sprinkled ahead of the blade regardless of the direction of travel of the arm.

The invention consists, apart from the arrange-ments expounded hereinabove, of a certain number of other arrangements which will be dealt with more explicitly later with regard to an embodiment described with refer-ence to the drawings appended hereto, but which is in no way limiting.

DESCRIPTION OF THE FIGURES

FIG. 2 is a diagrammatic side view of the arm of FIG. 1.

FIG. 4 is a view in vertical section, on a larger scale, of the base of the windscreen wiper arm and of the articulation clevis mounted on the drive shaft.

FIG. 5 is a plan view, with sectioned parts, of the base of the arm and of the articulation clevis of FIG. 4.

FIG. 6 is a vertical axial section along the line VI—VI, FIG. 7, level with the stirrup piece for articulating the windscreen wiper blade, with a rotating joint for supplying with washing liquid.

FIG. 7 is a section along the line VII—VII, FIG. 1, on a larger scale.

FIG. 8 is a diagrammatic view in elevation of the control for inverting the supply to the nozzles of the windscreen wiper arm.

FIG. 9 is an end-on view of an intermediate nozzle.

FIG. 10 is a view in section along the line X—X, FIG. 9.

FIG. 11 is a view in transverse section of an end nozzle.

Finally, FIG. 12 is a view in section along the line XII—XII, FIG. 11.

DESCRIPTION OF THE PREFERRED EMBODIMENT

Figure 1:
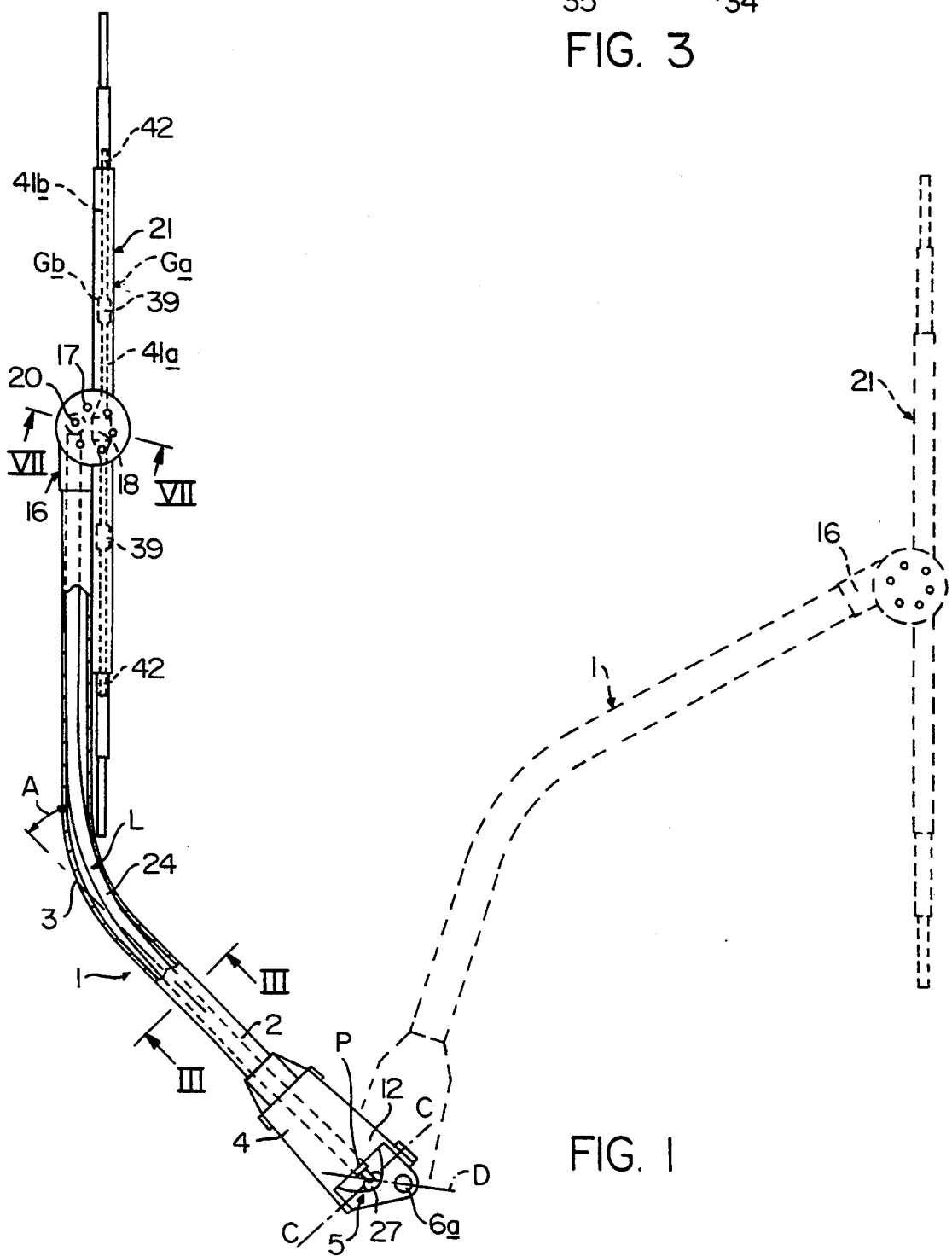
FIG. 1 of these drawings is a diagrammatic view in elevation, with parts in section, of a windscreen wiper arm in accordance with the invention.

Referring to the drawings, particularly to FIGS. 1 and 2, a windscreen wiper arm 1 can be seen, intended for a very high-speed train, formed by a tubular element 2 bent at an angle A, for example at approximately 30° in a middle region 3, termed "bend".

At one end, the arm 1 includes a base 4 which is articulated onto a clevis 5 mounted on a drive shaft 6a capable of imparting to the arm an alternating rotational movement. The shaft 6a may be driven by a pneumatic motor M, partially represented in FIG. 8. The shaft 6a passes, in free rotation, through a sleeve 6b, which is coaxial and fixed relative to the supporting structure B.

The base 4 is articulated, in the vicinity of the drive shaft 6a, about an axis C—C (FIG. 5) which is substantially parallel to the surface of the windscreen to be wiped in order to allow the arm 1 to be lifted. Elastic means 7 (FIG. 4) for returning the arm against the windscreen are provided. These elastic means 7 may comprise, on each side of the median longitudinal plane of the base 4, a compression spring 8 mounted on a telescopic rod 9 which is articulated at one end 10 onto the clevis 5 and at the other end 11 onto the base 4. The end 10 is more remote from the windscreen to be wiped than the end 11, so that the telescopic rod 9 is inclined towards the windscreen to be wiped. The thrust of the spring 8 tends to extend the rod 9 and to apply the arm 1 against the windscreen.

An orientation member 12 which is fixed with respect to the supporting structure B of the windscreen is provided in the vicinity of the drive shaft 6a. This member 12, as can be seen in FIG. 4, consists of a sort of support comprising a split cylindrical sleeve 13 of relatively large diameter traversed by the sleeve 6b and fixed onto it by tightening two screws, in order to produce the fixed point. The upper end of this sleeve 13 includes a radial extension 14 whose edges converge, moving away from the axis of the sleeve 13 towards a cylindrical bearing surface 15 of smaller diameter constituting the fixed support point P.

The end 16 (FIGS. 1 and 7) of the arm 1, which end is remote from the drive shaft 6a, carries a lever 17 mounted so that it can rotate relative to the arm 1 about an axis 18 which is substantially parallel to the drive shaft 6a. The lever 17 may be in the form of a disc 19 provided with a radial extension a part or point of which, 20, separated from the axis 18, constitutes the end. The windscreen wiper blade 21 carried about the axis 18 retains a fixed orientation relative to the lever 17. The lever 17 may be formed by a set of two identical plates, separated from one another in a direction which is perpendicular to their plane, and between which there is engaged an articulation head e traversed by a pin f connected to the plates.

A stirrup piece 22 (see FIG. 7), carried about the axis 18, connected to the lever 17, supports the support member for the blade 21 with a possibility of the blade rotating about a transverse axis 23 which is orthogenal to the longitudinal direction of the blade and substantially parallel to the middle surface of the windscreen to be wiped.

Linkage means L are provided inside the tubular element 2 between the abovementioned fixed support point P and the end 20 of the lever in order to keep the lever 17 parallel to a fixed direction D which, in the example in question, corresponds to the straight line passing through the geometric axis of the shaft 6 and the centre of the bearing surface 15 (see FIG. 5).

In the example in question the linkage means L are set out so as to keep a constant length between the point P and the end 20 when the arm 1 rotates about the shaft 6. These linkage means L advantageously comprise a flexible rod 24, particularly made of plastic, arranged inside the tubular element 2.

As can be seen in FIG. 1, the flexible rod 24 extends from the fixed support member P as far as the end 20 of the lever, passing through the bend 3 of the tubular element 2. The articulation head e (FIG. 7) is fixed into the end of the rod 24.

The flexible rod 24 is sufficiently strong so as not to flatten and to retain a constant length as it bands.

At its end close to the support point P, the rod 24 is equipped with a head 25 provided with a flat part 26 whose plane is substantially parallel to the axis of the shaft 6, this part 26 being traversed by a hole capable of receiving an articulation pin 27. A clevis 28, including two wings between which the flat part 26 is received, is mounted so that it can rotate in the bearing surface 15 provided at the point P about an axis which is parallel to that of the shaft 6; the pin 27 is carried by a hole provided in each of the wings of the clevis 28. The assembly is set out so that for a given position, called the neutral or rest position of the windscreen wiper arm 1, the axis of articulation C of the base 4 on the clevis 5 is aligned with the pin 27 so that it is possible to raise the arm 1 by rotation about the common axis.

As a variant, the flexible rod 24 could be provided only over a fraction of the length of the tubular element 2 incorporating the band 3, this flexible rod being extended at each of its ends by straight rigid rods, then respectively articulated on the fixed support point P and on the end 20 of the lever.

Stop means 29 (see FIG. 5) are provided between the base 4 of the arm and the sleeve 13 so as to oppose the lifting of the arm 1 when the angular position of the arm relative to the supporting structure B is different from the one which provides the alignment of the axis C—C and of the pin 27. These stop means 29 comprise, for example, level with the sleeve 13, a collar 30 (FIG. 5) and, level with the base 4, a stud (FIG. 5) capable of bearing against the collar 30 and of preventing lifting when the position of the arm does not correspond to the predetermined angular position; in contrast, this stud 31 may pass beyond the collar 30, which allows the arm to be lifted, for the neutral or rest angular position represented in FIG. 5.

Figure 3:
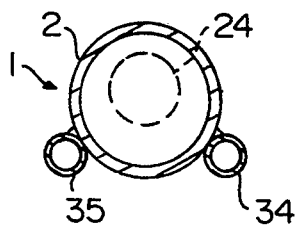
FIG. 3 is a transverse section along the line III—III, FIG. 1, on a larger scale.

The arm 1 is equipped, level with the blade 21, with two series Ga, Gb of nozzles 32a, 32b, 33a, 33b (FIGS. 9 to 12) for cleaning the windscreen. Each series Ga, Gb is supplied with liquid by an independent pipe 34, 35 (see FIG. 3) carried by the arm 1, under its lower part. These pipes consist of tubes of small diameter fixed in particular by welding under the arm 1.

Supply means F (see FIG. 8) are provided for alternately supplying each pipe 34, 35 and therefore each series of nozzles Ga, Gb during the to-and-fro movement of the arm 1. These supply means F comprise a reversing distributor 36 connected to a liquid supply source (not shown) consisting for example of a pump. The distributor 36 includes two opposite valves the ends 37a, 37b of which project outward.

The drive shaft 6a from the motor M drives two spring leaves 38a, 38b. At each end of travel, one of the leaves 38a, 38b depresses the corresponding pusher 37a, 37b in order to reverse the supply of the pipes 34, 35.

The end of sprinkling is controlled independently of the arm by a programmed distributor, the side of the nozzles located in the direction of starting of the arm remaining ready to operate (valve pressed by the spring), as soon as the arm starts.

As can be seen in FIG. 9, the nozzles 32a of the series Ga have their axis inclined in one direction, while the nozzles 32b of the other series have their axis inclined in another direction with respect to the direction which is orthogonal to the surface of the windscreen to be wiped. For example, the inclination of the axis of the nozzles 32a is such that the jet of liquid sprayed by these nozzles lies ahead of the windscreen wiper blade 21 when the arm 1 is rotating in the clockwise direction about the shaft 6a according to FIG. 1. The inclination of axis of the nozzles 32b allows the jet sprayed by these nozzles to be ahead of the blade 21 when the arm 1 is rotating in the anticlockwise direction about the shaft 6a. The two sets of nozzles Ga, Gb are connected up to the distributor 36 so that the supply of the nozzles always sprinkles the windscreen ahead of the blade 21 regardless of the direction of travel of the arm 1.

As can be seen in FIG. 9, the nozzles 32a, 32b, at a given point, are provided in a block 39, for example a metal block with a substantially rectangular transverse section. Cut sides are provided on the lower edges, perpendicularly to the direction of the nozzles 32a, 32b.

Each nozzle, such as 32a, as visible in FIG. 10, consists of a longitudinal slit, for example obtained by milling, the mean plane of this slit corresponding to the desired inclination. The slit opens out, inside the block, into a pipe 40 passing through this block, from one end to the other, longitudinally. At each end the pipe 40 includes parts of greater diameter which are tapped, allowing the connection to a pipe 41a, 41b, preferably a flexible pipe (see FIGS. 1 and 2).

The block 39 of FIG. 9 corresponds to an intermediate block, connected at each longitudinal end to a pipe.

FIG. 11 shows an end block 42 where nozzles 33a, 33b similar to those previously described are again found. The only difference lies in the fact that the pipe 43, provided inside the block 42 and into which the nozzle 33a opens is closed at that end which is intended to point towards the end of the blade 21. The open end of the pipe 43 is also connected to a pipe such as 41a.

The blocks 39 and 42 include, in their upper part, tapped holes 44 for fixing them onto the support member for the blade 21.

FIGS. 6 and 7 illustrate an example of means for connection between the tubes 34, 35 of the arm 1 and the pipes 41a, 41b of the two series of nozzles with the aid of a rotating seal provided level with a rotating head carrying the blade, at the end 16 of the arm.

The stirrup piece 22 is carried by a shaft 45 mounted so as to rotate in the head and capable of being driven in rotation by a sleeve 46 keyed onto this shaft, this sleeve itself being driven rotationally by the lever 17. The upper part 47 of this head is fixed relative to the arm 1 and includes internal pipes 48a, 48b which are connected, under the lower face of the head, to the pipes 34, 35 equipped with suitable connectors.

In the top part of the head, the pipes 48a, 48b open out into circular grooves 49a, 48b with which radially orientated bores 50a, 50b provided in the shaft 45 communicate. Sealing means are provided for isolating the grooves 49a, 49b in the axial direction of the shaft 45.

Each bore 50a, 50b communicates with a longitudinal passage 51a, 51b which is associated with it and which extends parallel to the axial direction of the shaft 45 as far as a transverse duct 52a, 52b opening out at each end so as to be connected by the pipes 41a, 41b to the nozzles of the series Ga, Gb located on either side of the shaft 45. This shaft 45 may therefore rotate freely in the upper part 47 relative to the arm 1 under the action of the lever 17 whilst providing connection for the liquid.

This being the case, the operation of the windscreen wiper arm in accordance with the invention results from the foregoing explanations.

In the rest position, the windscreen wiper arm 1 occupies the position in solid lines in FIG. 1.

When the motor M is switched on, the arm 1 starts its movement by a "to" stroke in the clockwise direction about the shaft 6a as far as the position represented in chain line in this same FIG. 1. There is then a reversal of the movement and the arm 1 returns, in the anticlockwise direction, to the position in solid lines and so on.

The assembly of the arm rotates about the geometric axis of the shaft 6a while the fixed point P remains immobile relative to the supporting structure. As a result the position of this point P relative to the arm 1 and to the clevis 5 varies during the rotation of the arm.

The flexible rod 24 located inside the arm, of constant length, will deform inside the arm 1 during the sweeping movement, and will keep a constant distance between the point P and the point 20 of the lever 17. Furthermore, the distance between the shaft and the articulation axis 18 of the lever carried by the rigid arm 1 remains constant. Thus, the straight line passing through the axis 18 and the point 20 during the movements of the arm 1 will remain parallel to the fixed direction D passing through the axis of the shaft 6a and the point P. The blade 21, as illustrated in FIG. 1, will remain parallel to a fixed direction during the sweeping.

This result is obtained with the aid of an arm 1 which is of small bulk, strong, and which offers a small windcatching surface; the linkage means L formed by the tube 24 are sheltered inside this arm 1.

If the user wishes to clean the windscreen, all he has to do is to supply liquid to the pipes 34 and 35, for example by switching on a feed pump, to obtain the sprinkling of the windscreen by the jets 32a, 32b, always ahead of the blade 21 regardless of the direction of its movement. This sprinkling is therefore particularly effective because it is immediately followed by the wiping provided by the blade 21.

In the embodiment described, the linkage means L for keeping the blade 21 parallel to itself involves a flexible rod 24.

Other means could be envisaged for obtaining this result. For example, it would be possible to arrange inside the tube 1 a flexible link such as a cable forming a loop of constant length winding around a pulley mounted so as to rotate about the axis 18 and whose ends would be fixed to points of the clevis 5, symmetrically to the shaft 6, a return being provided level with the bend 3. Holding means would be provided between the blade 21 and the abovementioned pulley so that the blade 21 retains the fixed orientation of the said pulley, which would constitute a means equivalent to the lever 17.

According to another variant, the linkage means L providing a constant distance between the point P and the end 20 would involve a volume of incompressible liquid contained in a pipeline which, at each end, would be provided with a movable piston extended by a rod connected respectively to the point P and to the end 20.

We claim:

1. A wind screen wiper arm assembly for wiping a windscreen comprising:
   a tubular element having first and seconds ends and a base at said first end;
   a clevis connected to said base by a pivot member having an axis substantially parallel to a surface of said windscreen, said tubular element and base being rotatable about said pivot member away from said wind screen, said clevis being connected to a drive shaft which rotates said clevis, connected base and tubular element parallel to said wind screen surface about a rotational axis;
   an orientation member fixed to structure supporting said wind screen, said orientation member defines a support point lying on an axis parallel to said rotational axis of said drive shaft;
   linkage means having first and second ends, said means connected at said first end to said orientation member at said, support point by a pivot pin which defines a pivot pin axis, said linkage means extending through said tubular element;
   a lever rotatably connected to the second end of said tubular element having a rotation axis parallel to said axis of said drive shaft, and connected to the second end of said linkage means;
   said pivot member and said pivot pin of the linkage means having their axes alignable for a given angular position of the tubular element relative to said structure;
   a wind screen wiper blade connected to said lever, said linkage means rotating said lever during wiping motion of said tubular element, to maintain a fixed distance between said support point and said rotation axis of said lever to maintain said wiper blade in a fixed orientation with respect to said wind screen; and,
   stop means for inhibiting rotation of said base about said pivot member when said pivot member axis is not in alignment with said pivot pin axis.

2. Windscreen wiper arm according to claim 1, wherein said linkage means comprises a flexible rod that is made from plastic, provided inside the tubular element.

3. Windscreen wiper arm according to claim 1, further comprising level with the wiper blade two series of nozzles supplying liquid cleaning the windscreen, each series of nozzles being supplied with liquid by an independent pipe carried by the arm.

4. Windscreen wiper arm according to claim 3, further comprising supply means to supply each series of nozzles in succession with liquid during to-and-fro movements of the wiper arm blade.

5. Windscreen wiper arm according to claim 3, wherein the nozzles of one series are inclined in one direction, while the nozzles of the other series are inclined in another direction, so that the windscreen is always sprinkled ahead of the blade regardless of the direction of travel of the arm.

6. The wind screen wiper arm assembly of claim 1 wherein said tubular element has a bend along its length.

7. A wind screen wiper arm assembly according to claim 1, wherein said linkage means comprises a flexible rod.

* * * * *